E. E. CLARK.
POWER TRANSMITTING MECHANISM.
APPLICATION FILED MAR. 8, 1916.
1,244,426.
Patented Oct. 23, 1917.
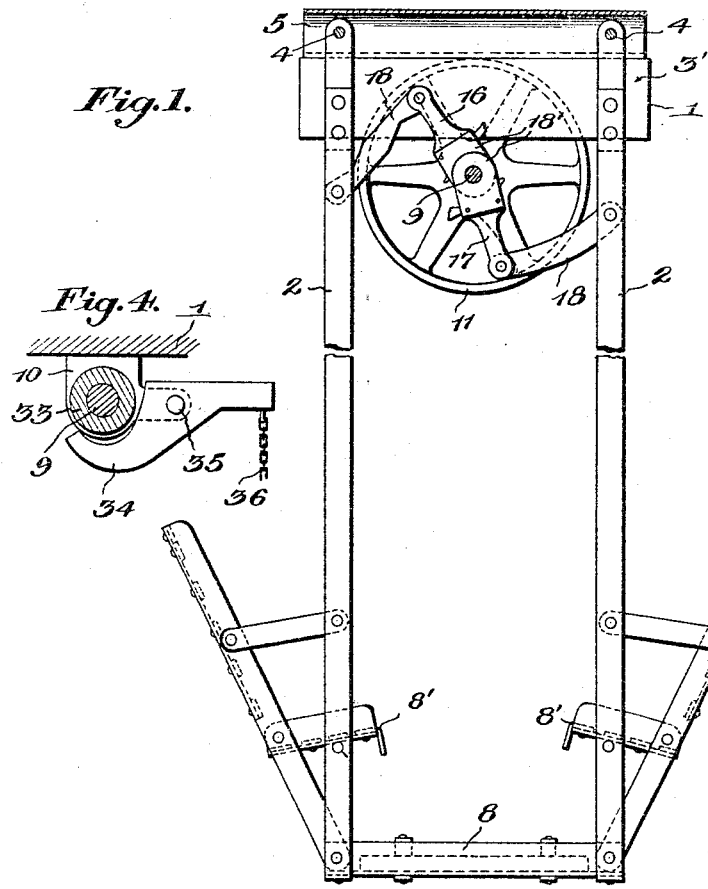
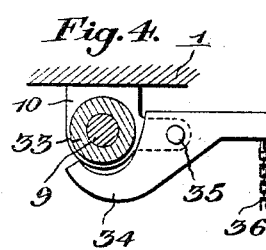
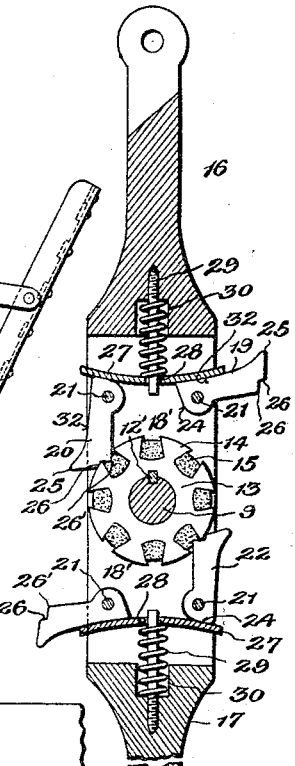
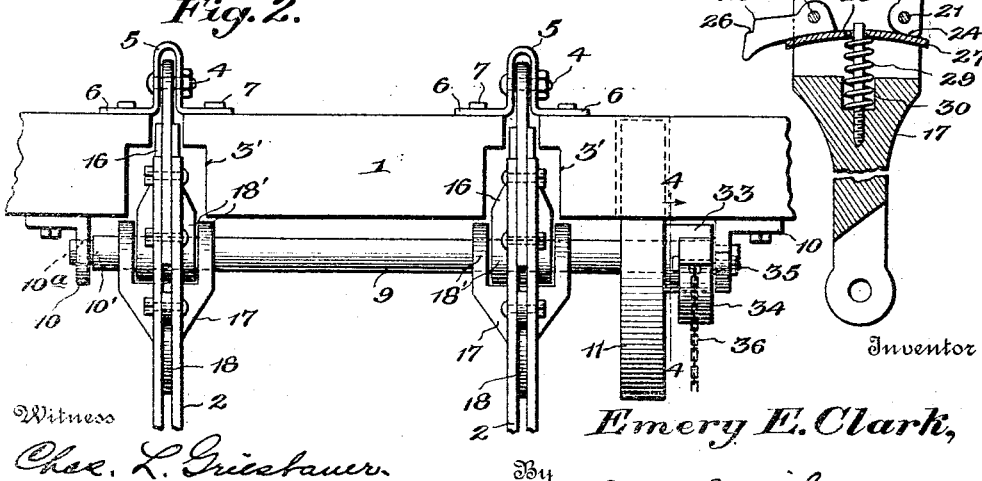
Inventor
Emery E. Clark,
By Bacon Milans
Attorneys
Witness
Chas. L. Griesbauer
G. Hedemeier

UNITED STATES PATENT OFFICE.

EMERY E. CLARK, OF OSKALOOSA, KANSAS.

POWER-TRANSMITTING MECHANISM.

1,244,426.   Specification of Letters Patent.   Patented Oct. 23, 1917.

Application filed March 8, 1916.   Serial No. 82,847.

*To all whom it may concern:*

Be it known that I, EMERY E. CLARK, a citizen of the United States, residing at Oskaloosa, in the county of Jefferson and State of Kansas, have invented certain new and useful Improvements in a Power-Transmitting Mechanism, of which the following is a specification, reference being had therein to the accompanying drawing.

The invention relates to improvements in a power transmitting mechanism utilizing the oscillating movement of the pivoted bars to impart rotation to a power shaft, which is capable of use in various fields. One instance of the use of my device is illustrated in my application, Serial No. 51,732, where the invention is shown in connection with a merry-go-round structure, in which the power transmitting shaft is employed for continuously advancing the swinging seats around a support.

The object of the invention is to provide a power transmitting mechanism of the character described, in which a suitable power shaft is provided having a driving connection with the swinging bars, whereby the movement of the bars is employed to impart a rotary movement to the shaft, and to permit this shaft to be rotated in a forward or reverse direction, or to completely lock the swinging bars so it is impossible to move these bars, which is very advantageous as it prevents unauthorized persons from using the swing at a time when damage would be done by rotating the shaft.

My invention also contemplates the providing of a structure in which the swinging bars may be entirely disconnected from the shaft if desired to allow the power transmitting shaft to remain idle during the swinging movement of the bars. So far as I am aware, it is new in the art to provide a power shaft of this type capable of being rotated in either direction or to be thrown out of operative relation with the swinging bars, as well as locking the bar to the shaft, and obviously the advantages derived from this construction are many, in that the traction wheel carried by the shaft may be propelled in a forward or reverse direction, or the power shaft may be disengaged with the driving device therefor at any time to permit the swing to be used without causing the rotation of the shaft. This is often desirable in view of the fact that when the actuating devices for the power shaft are disengaged therewith all noise is eliminated, and the swing is considerably easier to propel.

The preferred embodiment of my invention consists in arranging a driving or power transmitting shaft between the swinging bars supporting a suitable swing and having actuating links or arms carrying a plurality of pawls coöperating with the ratchet wheels on the shaft and coupled with the swinging bars. In this way the shaft may be driven in a forward or reverse direction upon the proper manipulation of the pawls, or, if desired, the shaft will remain inactive during the swinging movement of the bars by completely disengaging the pawls from the ratchet wheels. The swinging bars may be also locked against oscillation at any time by shifting the pawls so that they are all brought into engagement with the ratchet wheels. The pawls are retained in their various positions by means of spring-pressed shoes carried by the actuating levers and upon which the pawls bear, the shoes holding the pawls in any adjusted position.

The invention also embraces the use of a ratchet wheel having a plurality of inserts of rubber or other noise-deadening material arranged thereon in spaced relation around its periphery, to allow the pawls to travel over the ratchet wheel in the ordinary manner to rotate the power shaft, but at the same time eliminating the usual click incident to an operation of this character, but in no way affecting the desired gripping action between the pawls and the ratchet wheels.

The invention is capable of use in practically unlimited fields, and the power transmitting shaft may be used for driving any mechanism desired, whether the driven mechanism be located remotely of the power shaft or in close proximity thereto without departing from the invention.

In order that the invention may be completely understood reference may be had to the accompanying drawings forming a part of the invention wherein—

Figure 1 is a side elevation of the device;

Fig. 2 is a view showing the attachment of the side bars to the frame;

Fig. 3 is a sectional view of the ratchet wheel and the operating pawls; and

Fig. 4 is a detail view of the brake mechanism.

Referring now more particularly to the drawings wherein like numerals indicate corresponding parts, the numeral 1 designates a relatively wide supporting beam retained in position in any suitable manner and receiving the spaced parallel swinging bars 2. The bars 2 are pivotally attached to the beam 1 in any suitable manner, although the preferred mode of attaching these bars to the beam consists in recessing or forming slots 3' in each side of the beam and passing the upper ends of the bars 2 through the slots and mounting them upon the pivot pins 4. The pivot pins 4 pass through a metal U-shaped cap 5 extending entirely across the beam and spanning the slots therein, and having outstanding flanges 6 resting upon the top of the beam and supported in position by the bolts 7. The parallel bars 2 at their lower ends are jointed together so they swing in unison by a bottom portion 8, and seats 8' are suspended from each of the parallel bars. These seats are of the usual construction and form no part of my invention.

Underlying the supporting beam 1 is a power transmitting shaft 9 retained in position by the angle bars 10, whereby a rotary movement of the shaft is permitted, but lateral movement thereof is prevented by the shoulders 10' resting against the side of the angle bars. Each end of the shaft is reduced in diameter and received within an aperture 10' in the angular bearing plates 10. The shaft 9 near one end carries a friction wheel 11 rigidly attached thereto and rotatable with the shaft. In order to allow sufficient room for the friction wheel the beam 1 has a cutout portion of concave formation in its under side, but it is apparent the shaft could be of such length as to extend beyond the end of the beam, if desired. While I have shown the shaft as carrying a friction wheel, the same may carry a gear wheel meshing with a second gear wheel carried by an adjacent shaft in a manner as illustrated in my copending application. Mounted upon the shaft and keyed thereto by the key 12' are a pair of ratchet wheels 13 held in spaced relation with respect to each other and having a plurality of peripheral teeth 14 receiving therebetween relatively small plugs or inserts of sound deadening material 15 (preferably of rubber). The slots receiving the inserts are of dovetailed formation to prevent movement of these inserts and the inserts preferably project to a point near the outer surfaces of the teeth.

Mounted upon the shaft 9 are a plurality of levers 16 and 17 connected by links 18 with a swinging bar and carrying shiftable pawls coöperating with the wheels just described. I have illustrated two ratchet wheels with the operating pawls therefor, but it is, of course, apparent that good results can be obtained with the use of but a single ratchet wheel on the shaft and the two operating levers coacting therewith.

It is desirable in this type of apparatus to maintain a continuous movement of the power shaft, and to accomplish this result each ratchet has coöperating therewith two levers 16 and 17 carrying the shiftable pawls to be presently described. The levers 16 and 17 are bifurcated at one of their ends to provide arms 18' through which a shaft 9 passes. Positioned between the arms of the lever 16 are the pivoted pawls 19 and 20, supported by the pivot pins 21, while the lever 17 carries the pawls 22 and 23 which are supported in the same manner as the pawls 19 and 20 and are of the same specific construction. The pawls carried by the levers 16 and 17, of course, act alternately; that is, when the lever 16 is being shifted upon a swinging movement of the bars toward the left one of the pawls carried thereby is in driving relation with the ratchet wheel 13, while the pawls 22 and 23 supported upon the lever 17 are inactive, one of the pawls 22 or 23 being placed in operation upon the return movement of the swinging bars.

The pawls are of the same specific construction and as a description of one will suffice for all, a description of the pawl 19 will be given.

This pawl, near its pivoted end, is provided with a cam edge 24, while the gripping end of the pawl has a nose 25 shiftable over the teeth of the ratchet and a shoulder portion 26 adapted to engage the teeth while the edge 26' of the pawl is seated in the rubber insert when the pawl is in the position illustrated in Fig. 3.

As a suitable means for retaining the pawls 19, 20, 22, and 23 in their various positions of adjustment as shown in Fig. 3, the inner ends of these pawls rest upon spring-pressed shoes 27, arranged between the arms 18' of the levers 16 and 17 and capable of a sliding movement. The shoes are positioned well within the slots between the arms 18' of the levers 16 and 17 and extend entirely across the latter, the shoes being segmental in formation and have intermediate their ends an aperture 28 for the passage of the guiding posts 29, which are fastened to the levers 16 and 17. The levers 16 and 17 have sockets 30 therein receiving the coil spring 31 disposed around the guide posts 28 and bearing at all times upon the segmental shoes 27 to force these shoes into engagement with the rear ends of the pivoted pawls.

The pawls are all shiftable and capable of being placed in the positions shown in Fig. 3, at which time the shaft 9 will be driven in a forward direction upon the reciprocation of the swinging bars 2, the pawls 20 and 22 at this time coöperating with the ratchet wheel 13, when the pawls 19 and 23 are retained in a position at substantially right angles to the operating levers 16 and 17 by the segmental shoes 27. If, however, it is desired to reverse the rotation of the shaft 9 the pawls 20 and 22 are disengaged from the ratchet wheel 13 and the pawls 19 and 23 are shifted into engagement therewith, at which time the shaft will be rotated in a reverse direction upon the swinging of the bars. All of the pawls may be completely disengaged from the ratchet wheel 13 and shifted to the position occupied by the pawls 19 and 23 in Fig. 3, at which time the swing may be used while the power transmitting shaft 9 remains inactive. This has been found very desirable as the swing may be used the same as an ordinary swing at any time. By shifting or throwing of all the pawls into engagement with the ratchet wheel 13 the swinging bars 2 are positively locked against any oscillating movement, so that no unauthorized person can use the swing to cause the rotation of the power shaft, as it often happens that considerable damage might be done if the power shaft were driven at a time when no driving action is desired.

It will be seen that by having the inner edges of the pawls 19, 20, 22 and 23 provided with cam surfaces these pawls when in engagement with the ratchet wheel are resiliently forced into contact therewith by the spring-pressed shoe 27, and the pawls are permitted a slight rocking movement due to the cam edges thereof, while the shoulder portions of the pawls are passing over the teeth 14 on the ratchet wheels. The pawls also have their exposed sides 32 slightly curved to accord with the curvature of the segmental plate 27, so that this plate retains the pawls in their disengaged position as shown in Fig. 3.

When the pawls are traveling over the ratchet wheel when passing from one tooth to another they traverse the sound deadening segments 15, which to a great extent eliminate the noise incident to this operation, and render the pawl and ratchet mechanism practically noiseless. These inserts 15 are preferably composed of rubber, or other resilient material and when the pawl members pass from one tooth to another on the ratchet wheel they engage the inserts and as these inserts are flexible or resilient they assist in producing a positive gripping action between the shoulder portion on the pawl and the teeth on the ratchet wheel as the pointed edges of the pawls embed themselves in the rubber inserts, which inserts tend to prevent slipping of the pawls and maintain a tight gripping action.

Carried by the traction wheel 12 is a hub portion 33 forming a brake surface against which a pivoted braking block 34 coöperates. The braking block 34 is suspended by means of a pin or bracket 35 projecting from the bearing plate 10 and is actuated by a braking cord 36 extending to a position near the seat carried by the swinging bars. This braking mechanism is used to check the momentum of the swinging bars and shaft and bring the swing to a standstill very rapidly.

Having thus described the invention, it is believed that the same will be clearly understood, but a brief operation of the device may be stated as follows: When it is desired to drive the shaft 9 in a forward direction, the pawls 20 and 22 on the levers 16 and 17 are shifted to the position shown in Fig. 3, at which time they are engaging the ratchet wheel 13 and upon a swinging movement of the bars 2 a continuous rotary motion is imparted to the shaft 9. If it is desired to drive the shaft in a reverse direction the pawls 20 and 22 are disengaged from the ratchet wheel 13 and thrown into a position at substantially right angles to the levers 16 and 17 and the pawls 19 and 23 are placed in engagement with the ratchet wheel 13, the oscillating of the bars in this way rotating the shaft in a reverse direction through the medium of the levers 16 and 17 and link arms 18. It is also apparent that if necessary the transmitting shaft may remain idle by merely disengaging all of the pawls from the ratchet wheels and swinging these pawls to the position occupied by the pawls 19 and 23 in Fig. 3. When the pawls are in this position they are, of course, held by the segmental plates 27 in the manner that has been heretofore described. Now if it becomes necessary to lock the swinging bars to prevent the use of the swing by unauthorized persons the pawls 19, 20, 22 and 23 are thrown into engagement with the ratchet wheel, at which time it is impossible to move either one of the swinging bars as these bars are positively locked to the shaft by means of the levers 16 and 17 and links 18.

While I have described the preferred embodiment of my invention, I wish it to be understood that many changes can be made without departing from the spirit thereof and falling within the scope of the appended claims.

What I claim is:

1. A power transmitting mechanism, comprising spaced pivotal operating bars mounted for a swinging movement, a transmitting shaft, independent levers pivotally attached to the shaft, and a pair of separately adjustable pawls carried by each lever and adapted to have an engagement with the shaft, and means for connecting the levers to the swinging bars for continuously rotating the shaft in a forward or reversed direction upon a movement of the said bars.

2. A power transmitting mechanism comprising opposed pivotal operating bars, a transmitting shaft, means connected with the bars and engaging the shaft for rotating the same in a forward or reverse direction upon the swinging of the bars, said means being operable to lock the bars against movement.

3. A power transmitting mechanism comprising opposed pivotal operating bars, a transmitting shaft adjacent thereto, a pawl and ratchet connection between the bars and the shaft to actuate the shaft, including shiftable pawls on each side of the shaft and adapted to be thrown into or out of operative relation with the ratchet and engaging opposite sides thereof for rotating the shaft continuously in either direction, or allowing the same to remain idle, the said pawls being operable to lock the swinging bars to the shaft.

4. A power transmitting mechanism comprising opposed swinging bars swinging in the same direction, a power transmitting shaft between said bars and extending at right angles, and instrumentalities connected with the bars and operatively associated with the shaft for rotating the shaft in a forward or reverse direction upon the swinging of the bars.

5. A power transmitting mechanism, comprising opposed swinging bars, a power transmitting shaft adjacent said bars, and instrumentalities connected with the bars and operatively associated with the shaft for rotating the shaft in a forward or reverse direction upon the swinging of the bars, said instrumentalities being operable to lock the swinging bars against movement.

6. A power transmitting mechanism comprising opposed pivot bars swinging in the same direction, a transmitting shaft therebetween and extending at right angles thereto, a pawl and ratchet connection between the shaft and the swinging bars for rotating the shaft upon the swinging of the bars, including pivoted levers having mounted thereon a plurality of shiftable pawls separably adjustable whereby they may be thrown into or out of operative relation with their ratchet and means for retaining the pawls in their adjusted positions.

7. A power transmitting mechanism comprising opposed pivoted swinging bars swinging in the same direction, a power transmitting shaft between the bars and disposed at right angles thereto and having a ratchet wheel thereon, operating levers pivoted to the shaft and connected with the bars, independently shiftable pawls carried by each of the operating levers and adapted to be thrown into or out of operative relation with the ratchet to rotate the shaft upon the swinging of the bars, and resilient means carried by the levers and acting on the pawls for retaining them in their different positions, substantially as described.

8. A power transmitting mechanism, comprising opposed swinging bars swinging in the same direction, a pawl transmitting shaft disposed between said bars and extending at right angles to said bars, a pawl and ratchet connection between the bars and the shaft, including operating levers pivoted to the shaft and one connected to each bar, separately adjustable pawls carried by each lever and adapted to be moved into or out of driving relation with the shaft, and means for retaining the pawls in their various positions, a shoe disposed within a slot in each of the levers, and a coil spring beneath each shoe for forcing the shoes into engagement with the pawls whereby the pawls are retained in their adjusted positions.

9. A ratchet of the character described having a plurality of spaced pawl engaging teeth, and independent inserts disposed between each of said teeth, substantially as described.

10. A ratchet of the character described having a plurality of spaced ratchet teeth, and removable inserts of noise deadening material arranged between the teeth and extending to a point near the periphery of the ratchet teeth, said inserts extending across the periphery of the ratchet, for the purpose described.

11. A ratchet of the character described having a plurality of spaced pawl engaging teeth, and removable inserts extending across the periphery of the ratchet and arranged between said teeth and extending to a point near the outer edges thereof, substantially as described.

12. A ratchet of the character described having a plurality of spaced pawl engaging teeth, and laterally disposed inserts separating said teeth, substantially as described.

13. A ratchet of the character described having a plurality of separated ratchet teeth, and sound deadening means disposed between the individual teeth, substantially as described.

14. A ratchet of the character described having a plurality of pawl engaging teeth, removable inserts extending transversely across said ratchet and disposed between the teeth, substantially as described.

15. A ratchet of the character described having pawl engaging teeth, and separately removable inserts arranged between said teeth, substantially as described.

16. A ratchet of the character described having suitable pawl engaging teeth, and a plurality of separately removable inserts disposed between successive teeth, substantially as described.

17. A ratchet of the character described having suitable pawl engaging teeth, and a plurality of spaced removable sound deadening inserts positioned between said teeth and over which the pawl travels to render the ratchet substantially noiseless, substantially as described.

18. In a power transmitting mechanism, the combination with swinging members, and means for supporting the same, of a transmitting shaft, instrumentalities connecting said shaft with the swinging members for rotating the same upon a swinging of the members, said instrumentalities also being adapted to lock the swinging members upon the proper adjustment thereof to the transmitting shaft.

19. A power transmitting mechanism comprising spaced pivotal operating members mounted for a swinging movement in the same direction, and maintained a uniform distance apart during such swinging movement, a transmitting shaft, levers pivotally connected to the shaft and having a connection with the swinging members, a pair of separately adjustable driving devices carried by each lever and adapted to have an engagement with the shaft for rotating the same continuously in a forward or reverse direction upon the swinging of the members.

20. A ratchet of the character described having suitable pawl engaging teeth and a number of removable inserts disposed across the periphery of the ratchet between said teeth, substantially as described.

In testimony whereof I hereunto affix my signature in the presence of two witnesses.

EMERY E. CLARK.

Witnesses:
W. E. HUDDLESTON,
T. A. HUDDLESTON.

Copies of this patent may be obtained for five cents each, by addressing the "Commissioner of Patents, Washington, D. C."